(12) United States Patent
Malik (10) Patent No.: US 10,917,793 B2
(45) Date of Patent: Feb. 9, 2021

(54) VERIFYING NETWORK SUBSYSTEM INTEGRITY WITH BLOCKCHAIN

(71) Applicant: T-Mobile USA, Inc., Bellevue, WA (US)

(72) Inventor: Sireen Malik, Bothell, WA (US)

(73) Assignee: T-Moblle USA, Inc., Bellevue, WA (US)

(*) Notice: Subject to any disclaimer, the term of this patent is extended or adjusted under 35 U.S.C. 154(b) by 0 days.

(21) Appl. No.: 16/291,874

(22) Filed: Mar. 4, 2019

(65) Prior Publication Data

US 2020/0059487 A1 Feb. 20, 2020

Related U.S. Application Data

(60) Provisional application No. 62/719,341, filed on Aug. 17, 2018.

(51) Int. Cl.
*H04W 12/10* (2009.01)
*H04L 29/06* (2006.01)
(Continued)

(52) U.S. Cl.
CPC .......... *H04W 12/10* (2013.01); *H04L 9/0618* (2013.01); *H04L 9/0643* (2013.01);
(Continued)

(58) Field of Classification Search
CPC . H04L 63/1433; H04L 41/0853; H04L 63/20; H04L 9/0618; H04L 41/0803;
(Continued)

(56) References Cited

U.S. PATENT DOCUMENTS 6,925,566 B1 * 8/2005 Feigen ................. H04L 63/102
                                                      348/E7.069
2003/0138135 A1   7/2003 Chung et al.
(Continued)

FOREIGN PATENT DOCUMENTS

EP           0963637 B1     7/2007

OTHER PUBLICATIONS

Choyi, et. al., "Network slice selection, assignment and routing within 5G Networks", 2016 IEEE Conference on Standards for Communications and Networking (CSCN), Oct. 2016, see section III, 9 pages.
(Continued)

*Primary Examiner* — Huan V Doan
(74) *Attorney, Agent, or Firm* — Lee & Hayes, P.C.

(57) ABSTRACT

In a telecommunication network, individual network slices are provided for various uses and/or for various enterprise customers. A network subsystem such as a network slice comprises multiple components, such as routers, applications, virtual network functions, etc. Each component of the subsystem generates and provides a digital signature, such as a hash, based on state properties of the component that have been designated as being invariant. The signatures from the multiple components are then combined and hashed to form a subsystem signature. A chronological sequence of subsystem signatures is saved in a distributed ledger, which may use blockchain technology to protect against after-the-fact modifications to the saved signatures. A network threat may be detected by detecting situations in which the subsystem signature of a particular subsystem changes over time. A saved blockchain, containing the sequence of signatures, can be provided as historical evidence of network integrity.

15 Claims, 5 Drawing Sheets

(51) Int. Cl.
*H04L 12/24* (2006.01)
*H04L 9/06* (2006.01)

(52) U.S. Cl.
CPC ...... *H04L 41/0803* (2013.01); *H04L 41/0853* (2013.01); *H04L 63/1433* (2013.01); *H04L 63/20* (2013.01); *H04L 2209/38* (2013.01)

(58) Field of Classification Search
CPC .............. H04L 9/0643; H04L 2209/38; H04L 2209/805; H04L 9/3247; H04L 9/3239; H04W 12/10; H04W 12/1008
See application file for complete search history.

(56) References Cited

U.S. PATENT DOCUMENTS

| | | | |
|---|---|---|---|
| 2009/0089860 A1* | 4/2009 | Forrester | H04L 9/3236 726/3 |
| 2011/0093701 A1* | 4/2011 | Etchegoyen | G06F 21/121 713/165 |
| 2015/0261609 A1 | 9/2015 | Resch et al. | |
| 2015/0349810 A1 | 12/2015 | Baxley et al. | |
| 2018/0013779 A1* | 1/2018 | Aguayo Gonzalez | H04L 63/06 |
| 2018/0337931 A1* | 11/2018 | Hermoni | H04L 63/123 |
| 2019/0004789 A1* | 1/2019 | Mills | G06F 8/36 |
| 2019/0332773 A1* | 10/2019 | Konetski | H04L 63/18 |

OTHER PUBLICATIONS

The PCT Search Report and Written Opinion dated Nov. 11, 2019, for PCT Application No. PCT/US2019/044301, 10 pages.
Saini, Vaibhav, "ConsensusPedia: An Encyclopedia of 30 Consensus Algorithms," retrieved on Oct. 30, 2018, at <<http://hackermoon.com/consensuspedia-an-encyclopedia-of-29-consensus-algorithms-e9c4b4b7dQ8f>>, ConsensusPedia, pp. 1-40.
Tomonaga, Shusei, "JPCERT/CC Blog, Classifying Malware using Import API and Fuzzy Flashing—impruzzy," retrieved on Oct. 30, 2018, retrieved at <<http://blog.jpcert.or.jp/2016/05/classifying-mal-a988.html>>, pp. 1-3.
Wikipedia, "Blockchain," retrieved on Oct. 30, 2018, at <<http://en.wikipedia.org/windex.php?title=Blockchain&oldid=855030838>>, Wikimedia Foundation, Inc., pp. 1-13.
Wikipedia, "Consensus (computer science)," retrieved on Oct. 30, 2018, at <<http://en.wikipedia.org/windex.php?title=Consensus_(computer_science)&oldid=851586241>>, Wikimedia Foundation, Inc., pp. 1-6.
Witherspoon, Zane, "A Hitchhiker's Guide to Consensus Algorithms, A Quick Classification of Cryptocurrency consensus Types," retrieved on Oct. 30, 2018, retrieved at <<http://hackermoon.com/a-hitchhiker's-guide-to-consensus-algorithms-d81aae3eb0e3>>, pp. 1-11.

* cited by examiner

VERIFYING NETWORK SUBSYSTEM INTEGRITY WITH BLOCKCHAIN

CROSS-REFERENCE TO RELATED APPLICATION

This application claims priority to a commonly owned U.S. Provisional Patent Application No. 62/719,341 filed on Aug. 17, 2018, and titled "Network-Component Monitoring for Security," which is herein incorporated by reference in its entirety.

BACKGROUND

Network slicing is a technology that has been proposed to enhance flexibility in wireless communication networks. Network slicing allows multiple logical networks to operate using a common underlying infrastructure. Network slicing can reduce costs of deployments, increase the efficiencies of physical infrastructures, and provide flexibility in the types of services that may be offered to different users. Dedicated network slices can be provided for enterprise customers of a network operator, with the slices being customized to the needs of the customers.

A slice-based communication network can have multiple software-defined core networks, referred to as slices, each of which may be optimized for a different type of service. For example, an LTE (Long-Term Evolution) core network can be provided for 4G (4rd-Generation) LTE services and an IMS (IP Multimedia Subsystem) core network can be provided for multimedia messaging. Generally, network slices can be provided for many different purposes, such as Internet browsing, voice communications, industrial control, home automation, IoT (Internet of Things), etc. Furthermore, different slices may be configured to provide different Qualities of Service (QoS). For example, one core network may be designed for low latency while another core network might be designed to provide fast streaming.

Threat detection is an important part of any communication network, including slice-based networks. Threat detection systems attempt to detect malicious attacks that are designed to gain unauthorized access to private, secret, or otherwise non-public information. Malware is increasingly obfuscated or otherwise disguised in an effort to avoid detection by security software. Determining whether a program is malware or is exhibiting malicious behavior can thus be very time-consuming and resource-intensive. As network components become more sophisticated, they may be targeted more often by malware.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for detecting unauthorized modifications to components of a network, e.g., physical devices connected to a network or network functions implemented on physical devices (e.g., running in a virtual machine).

In a described embodiment, different types of state properties are periodically collected from multiple components of a network slice, including physical components, virtual components, and/or software components. The collected state properties, referred to herein as designated state properties, relate to component characteristics that are intended or expected to remain unchanged through the lifecycle of the network slice. As one example, a cryptographic hash of a component's firmware may be designated as a state property that is intended to remain unchanged throughout the lifetime of a network slice. As another example, a list of users that have been granted administrative roles may be designated as a state property that should remain unchanged.

In various examples, the state of each component is represented by a signature, e.g., a cryptographic hash value computed over the state of that component. Reported signatures from the various components of the network slice are aggregated and a digital signature of the aggregated signatures is computed. Over time, this signature, referred to herein as a slice signature, is calculated over and over using the same technique to create a chronological sequence of slice signatures.

In various examples, each component is deployed in a known-good (or believed-good) state. That state is associated with a particular slice signature. The slice signature is monitored to ensure that it remains constant. If the signature varies at any time, a potential threat is reported and/or threat mitigation procedures are initiated. This can permit detecting intrusion of malware into network components without requiring deep packet inspection or other forms of behavioral detection, and without requiring antivirus systems running at each network component. Behavioral detection and antivirus software both consume resources at network components, so detecting malware without either of those can increase network capacity and throughput, reduce packet processing latency at network components, or otherwise improve network performance.

In various examples, slice signatures are generated periodically, e.g., approximately hourly or on a different time schedule. Each signature is stored as or in a transaction in a distributed ledger in association with information identifying the network slice, such as a fully-qualified domain name representing the network slice. A transaction can also include a timestamp indicating the time the signature was determined or the time the transaction was recorded.

A distributed ledger is designed to replicate and synchronize data between multiple databases. In some systems, the databases may be geographically distributed over a large geographic area, which protects the data from loss. The databases are configured to synchronize with each other using peer-to-peer communications and consensus-based data synchronization between multiple distributed data stores. Consensus-based data synchronization algorithms are designed so that a majority or some percentage of the databases must agree upon any changes before the changes are committed. In some peer-to-peer ledgers, there may be no central database administrator, and therefore no single point that can be attacked to introduce unauthorized changes.

In some embodiments, data within a distributed ledger may be stored using blockchain technology, in which data is recorded in blocks that are cryptographically linked, in the sequence of their creation or addition, to prevent after-the-fact changes of the data. Data stored in this manner is considered to be immutable because once stored, it would be very difficult to alter the data. Accordingly, it can serve as a historical record of network slice integrity.

The distributed ledger may be either private or public. In a private distributed ledger, also referred to as a permissioned ledger, multiple databases are administered by a single entity and/or by other specifically authorized entities. In a public distributed ledger, also referred to as a permissionless ledger, the databases can be administered by any entity. In either case, consensus algorithms ensure that no individual entity can alter the saved data without the participation and agreement of some number of other entities. Because of consensus-based synchronization, an attack on the stored data needs to involve more than a given percentage of the distributed databases.

Storing slice signatures in a blockchain protects against various attack scenarios. As an example, an adversary may wish to change a stored signature in the distributed ledger, which would permit the adversary to install malware in a network component without being detected. However, the use of a blockchain forces the adversary to recalculate a large portion of the blockchain in order to change even a single signature. Furthermore, the peer-to-peer distributed ledger forces an adversary to change the blockchain at more than half of the peers (or another value specific to the type of consensus algorithm) in order for the falsified signature to be accepted into the distributed ledger.

The ability to provide an auditable, immutable history that demonstrates network slice integrity may be a valuable feature for which enterprise customers are willing to pay.

The techniques described herein may allow the programmatic detection of malicious activity. Various examples herein can be performed without human judgement regarding whether a program or data block is in fact malicious. Techniques herein can permit more readily identifying potential threats, e.g., in the context of a cloud security service or security appliance used in a telecommunication network.

Security actions taken in response to detecting a change in a slice signature may include removing a network component from the network, blocking packet flows, blocking execution of processes, terminating processes, blocking DNS lookups or network connections, terminating lookups or connections already in progress, deleting, renaming, or quarantining files, and so forth.

For purposes of discussion, the introduction above has been in the context of a telecommunication system that implements network slicing. However, the described techniques can be used in any environment having multiple components that are capable of providing state information or that are capable of providing signatures of state properties. Generally, the described techniques can be used to provide an immutable integrity record for any system or subsystem of physical, virtual, and/or software components, not limited to components of network slices.

Figure 1:
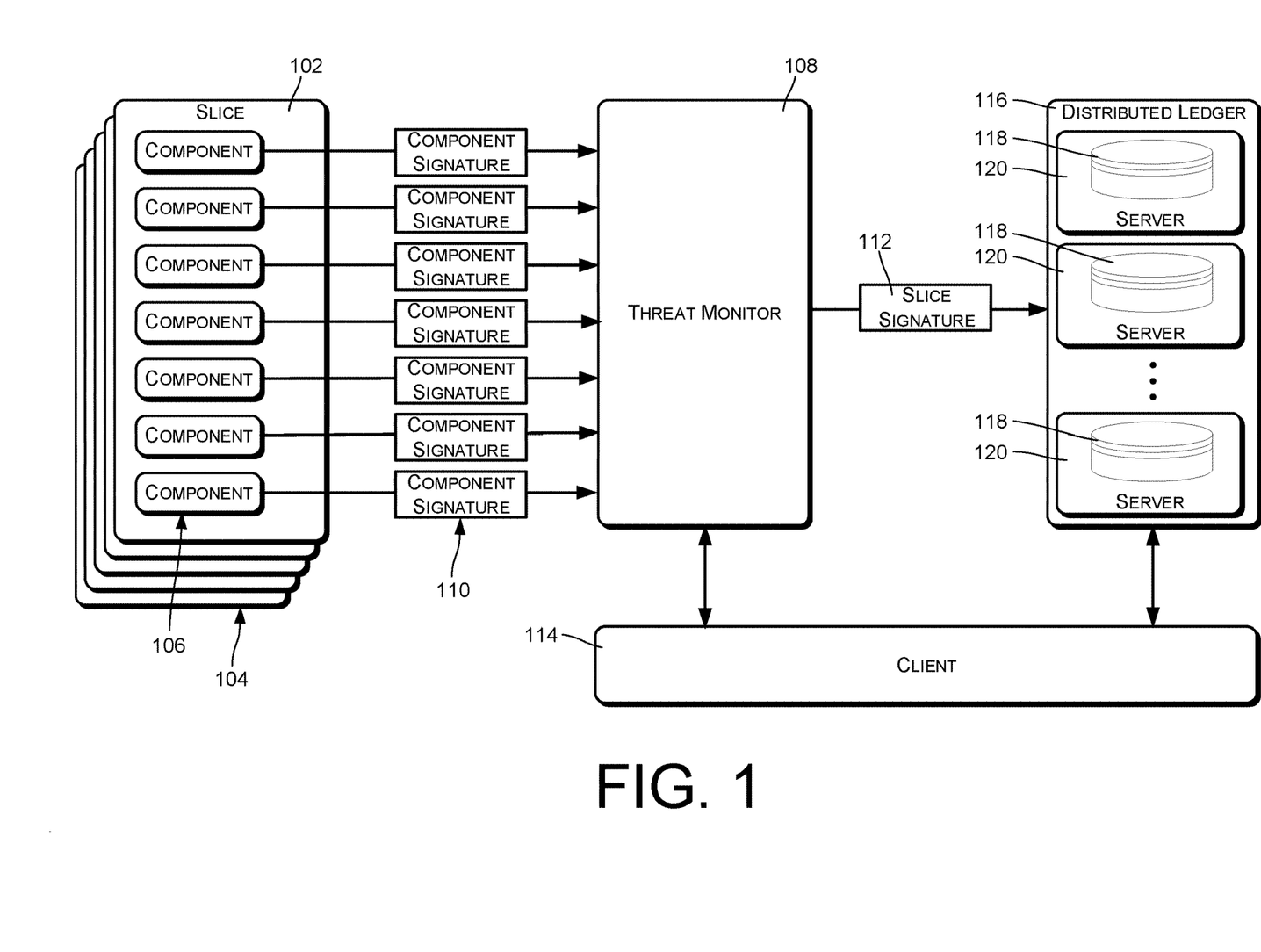
FIG. 1 is a block diagram illustrating techniques for detecting malicious activities performed against a network subsystem such as a network slice.

FIG. 1 illustrates a technique for ensuring the integrity of multiple network slices or other subsystems of networkable components. The techniques described here can by implemented by an operator of a telecommunication network, such as a cellular communication network, to detect potential attacks and to provide an immutable, auditable history of network slice integrity.

FIG. 1 shows a network slice 102 as an example of multiple network slices 104 that may exist at any given time within a telecommunication network. The network slices 104 may correspond to or comprise multiple dedicated core networks, as an example. Different core networks may be provided for different types of services, for different types of customers, for different types of traffic, to provide different levels of QoS (Quality of Service), etc. Various of the network slices 104 may also implement other parts of a telecommunication system, such as radio access networks, IP Multimedia Subsystems, and so forth.

In certain embodiments, the network slices 104 may comprise software-defined networks, and may at times be referred to as "virtual" network slices. In certain situations, network slices may be dynamically created and destroyed in response to increasing and decreasing demands for services or in response to other variable needs of enterprise customers.

The network slice 102 comprises multiple components 106, including physical components as well as software and virtual components that may be implemented by or based on the physical components. The components 106 may include, without limitation:

routers;
switches;
gateways;
Internet-of-things devices;
virtual network functions;
containers;
software applications;
software modules;
virtual machines;
radios;
radio access networks;
Internet Multimedia Subsystems (IMSs);
etc.

The components 106 may be located in geographically diverse locations and may communicate with each other through available data networks, which may include both wired and wireless data networks. In many cases, the components communicate using Internet Protocol (IP) packet-based messaging.

The network slice 102 may be created by instantiating virtual components, using a hardware infrastructure that is common to multiple components and/or network slices. The components 106 are initially configured as needed to perform their designated functions within the network slice 102. Configuration may include installing software, configuring settings, initializing data, allocating or assigning resources, defining functions, setting permissions, and so forth. Instantiation and configuration may be performed in some cases as an automated process, based on predefined parameters or code/data images.

Each component 106 has certain state properties that remain constant during operation. Any change to these state properties represents a potential violation of network integrity. As an example, a checksum of a component's operating system code might be expected to be unchanging during operation of the network slice. As another example, the identity of users having administrator privileges may be expected to be unchanging. Invariant state properties may include checksums, signatures, hashes, lists, parameters, settings, and so forth. The actual state properties that are to remain constant over time may vary from one component to another.

Certain types of component states may be represented by digital signatures. For example, firmware state may be represented as a signature of the firmware code, where the signature is generated in such a way that any change to the firmware code will result in a different signature. Lists, tables, data objects, software applications, software modules, and other types of data may also be represented as signatures.

For purposes of this disclosure, the term "signature" is used to indicate a bit string that (a) is calculated from or otherwise generated as a function of input data, (b) remains constant when the input data remains constant, and (c) changes when the input data changes. Signatures may include message digests, checksums, digital fingerprints, hash values, and other bit strings that may be calculated in various ways from the input data. A signature is typically much smaller that the input data. In some cases, signatures may have a fixed length, regardless of the size of the input data.

A hash value is a bit string that is calculated using a mathematical one-way function, referred to as a hash function, so that the original input data cannot be derived from the hash value. When the term "hash" is used as a verb, it refers to the creation of a hash value by applying a hash function. The term "hash" may also be used as a noun to reference a hash value.

In the example configuration shown by FIG. 1, a threat monitor 108 is configured to receive a component signature 110 from each of the slice components 106. The threat monitor 108 is shown here as a representation of logical functionality that may be performed by any of various entities of a communication network and/or by entities associated with the communication network. In practice, the functionality attributed herein to the threat monitor 108 may be performed by one or multiple elements of a network infrastructure, including both special-purpose and general-purpose hardware and software. As an example, the functions of the threat monitor 108 may be performed by the same entity that supervises and manages the network slices 104.

Each component signature 110 represents the current state of a respective component 106. To create a component signature 110, various state properties of the component as described above are identified and designated as being invariant. The designated invariant properties are collected and aggregated in a repeatable way to create a data object that is then hashed to create the component signature 110.

The term "invariant" is used herein to indicate properties that do not change during normal operations, but which may change in response to abnormal circumstances such as when an unauthorized entity is attempting to gain access to a component or network slice.

In some embodiments, a component 106 may itself calculate and provide its corresponding component signature 110. For example, a daemon (not shown) may run within the slice 102 or within each component 106 of the slice 102 to gather state properties and to create the component signatures 110.

In other embodiments, the threat monitor 108 may query the network slice 102 and/or the components 106 of the network slice for state properties. The threat monitor 108 may obtain state properties for a component 106 and calculate the corresponding component signature 110 based on the obtained state properties.

The threat monitor 108 receives or generates the component signatures 110, concatenates them or otherwise combines them to form a single data object, and hashes the data object to create a slice signature 112. The slice signature 112 corresponds to the current state of the slice 102, and is expected to remain invariant.

In some embodiments, the slice signature may comprise a Merkle tree root hash of the component signatures 110.

For each slice 102, a chronological sequence of slice signatures 112 may be generated and stored. That is, the threat monitor 108 may periodically receive the component signatures 110 from the respective components 106 (or create the signatures 110 from state properties received from the components 106) and calculate a new slice signature 112 based on the component signatures 110.

The threat monitor 108 monitors the slice signature 112 to detect changes in the slice signature 112 over time. Any change in the slice signature 112 signifies a change in one or more designated invariant state properties of the slice 102, which in turn signifies a potential threat, intrusion, or other violation of slice integrity. Upon detecting a change, the threat monitor 108 may notify a client 114 such as a threat management system maintained by the operator of the telecommunication network. In response, the client 114 may generate a notification and/or initiate threat mitigation procedures. The threat monitor 108 may have an API and/or other means for communicating with a client 114 and with other network entities.

In some cases, the client 114 may periodically query the threat monitor 108 to obtain the most recent slice signature 112 and may itself determine whether there have been any changes in the slice signature 112. In some cases, the client 114 may query or signal the threat monitor 108 to initiate the collection of the component signatures 110 and the creation of the slice signature 112. That is, the process of collecting the component signatures 110 and generating the slice signature 112 may be driven by the client 114.

In some embodiments, the slice signature 112 may be provided to a distributed ledger system 116 for long-term storage. The distributed ledger system 116 includes multiple data stores or databases 118 that are geographically distributed over a large area, such as across a country or across multiple countries. The distributed ledger system 116 is designed to replicate and store identical data in each of the databases 118.

In some examples, the distributed ledger system 116 may be implemented using cloud computing. Cloud computing allows for computing resources to be provided as services rather than as a deliverable product. For example, in a cloud computing environment, resources such as computing power, software, information, or network connectivity are provided (for example, through a rental agreement) over a network, such as the Internet.

In other examples, the distributed ledger system 116 may be implemented using a plurality of computing appliances operated by or on behalf of a particular user, group, or organization. For example, a corporation may deploy an appliance per office site, per division, or per geographic region (e.g., ten or 8-12 peers per country, spread geographically). In some examples, a computing appliance can be used in addition to, or instead of, a cloud service.

For each slice 102, the threat monitor 108 may store a chronological sequence of slice signatures 112 that have been generated throughout the life of the slice 102, as a record of whether or not the designated invariant state properties of the slice 102 have changed since creation of the slice. Each slice signature 112 may be stored along with a timestamp indicating the time at which the slice signature 112 was obtained or generated. In some embodiments, each newly generated slice signature 112 may be stored in the distributed ledger system 116 as is it generated, resulting in a continuously growing list of signatures.

In some cases, the distributed ledger 116 may comprise multiple geographically-distributed servers 120, each of which manages a corresponding one of the databases 118. The distributed ledger 116 may be configured to operate without a central authority and to instead use peer-to-peer communications between the servers 120 to replicate and synchronize data across the databases 118. Synchronization may be performed using a consensus algorithm, such that any proposed addition, deletion, or modification to the databases 118 must be agreed upon by a predetermined percentage of the servers 120 before being committed. For example, a proposed addition of data to the distributed ledger 116 might be committed only after a majority of the servers 120 agree upon the proposed change. This makes it difficult for an attacker to alter the stored data, because the attacker would need to alter the data in a majority of the databases 118 before the change would be accepted.

Figure 2:
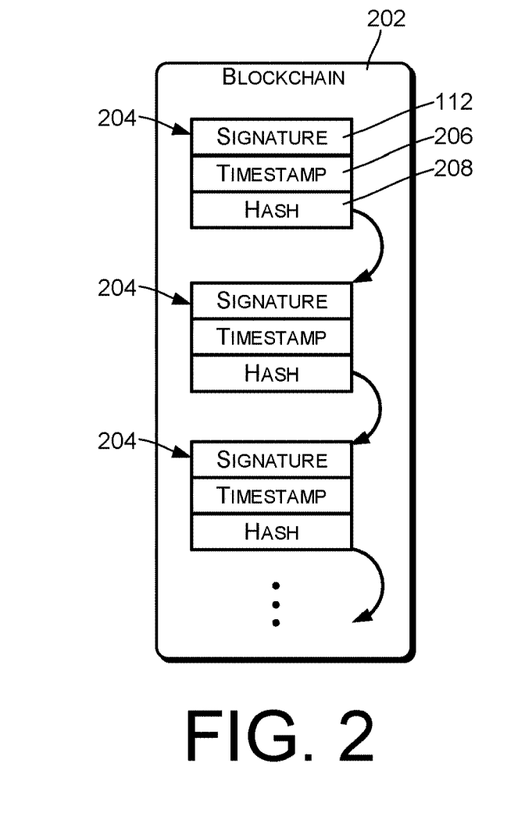
FIG. 2 is a block diagram illustrating the use of a blockchain for storing an immutable record of network subsystem integrity.

FIG. 2 illustrates how a chronological sequence of slice signatures 112 may be stored as a list of linked hash values to create a blockchain 202. The blockchain 202 comprises multiple data blocks 204. Each data block 204 is a data object containing a slice signature 112 and a corresponding timestamp 206. As new slice signatures 112 are received, respectively corresponding new blocks 204 are added to the blockchain 202. In addition to the slice signature 112 and corresponding timestamp 206, each block 204 has a hash value 208, which is generated from and links to the previous block 204 in the blockchain 202. FIG. 2 shows multiple blocks 204 in the sequence of their creation from bottom to top. The uppermost block 204 of the blockchain 202 is the most recently added block.

During normal operation, all of the signatures 112 stored by the blockchain 202 should be equal to each other. If they are not, there may have been a violation of network slice integrity. In this case, the timestamp at point within the blockchain where the signature takes on a new value indicates the time at which the potential violation occurred.

As part of an attack, an attacker might attempt to alter the blockchain 202 to prevent an alarm from being raised in response to tampering with components of the network slice 102. For example, the attacker may attempt set all of the signatures 112 to the same value. This would be difficult, however, because the chain would need to be recalculated for every block subsequent to where the change was introduced. Furthermore, this would need to be accomplished on a majority of the servers 120. Otherwise, the consensus-based synchronization algorithms of the distributed ledger would prevent the attempted change from being committed.

Figure 3:
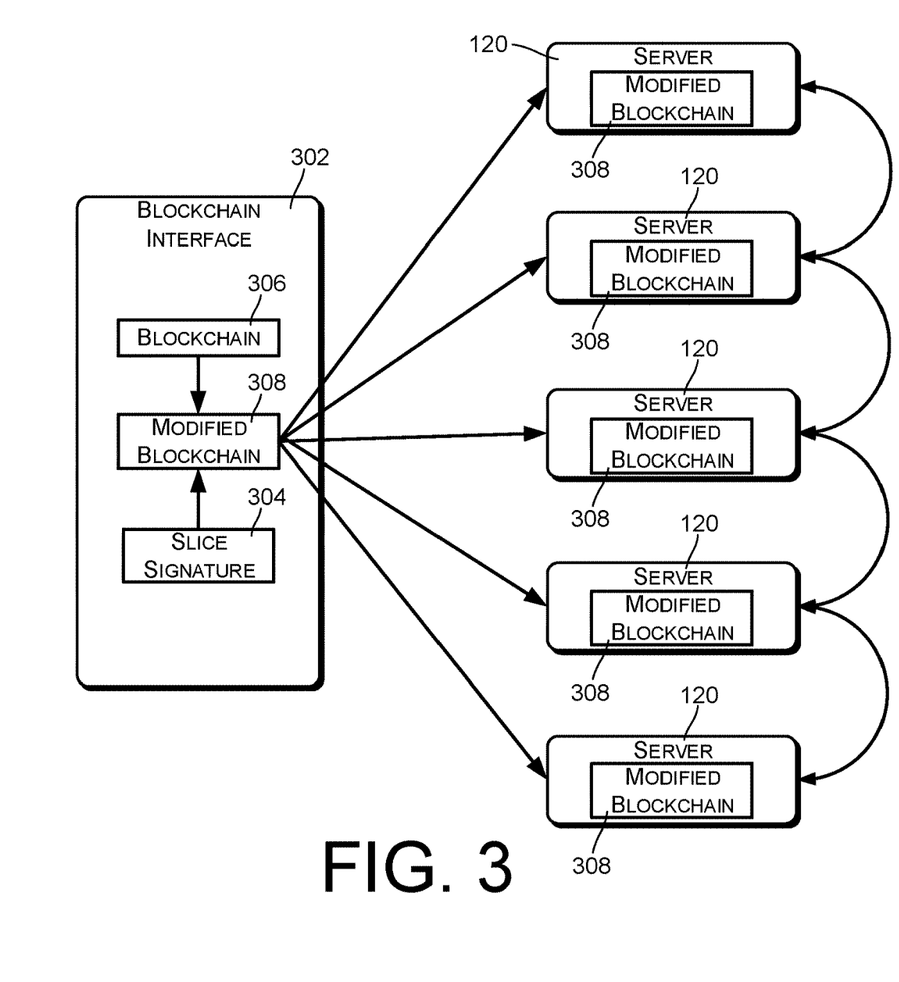
FIG. 3 is a block diagram illustrating the use of a distributed blockchain ledger for storing an immutable record of network subsystem integrity.

FIG. 3 illustrates how the blockchain 202 may be stored within the distributed ledger system 116. FIG. 3 also illustrates how newly received or created slice signatures are added to a stored blockchain.

FIG. 3 shows a blockchain interface 302 as a general representation of functionality that might be implemented either by the distributed ledger 116, by the threat monitor 108, by one of the servers 120, or by some other component.

To store a new slice signature 304, the blockchain interface 302 obtains the existing blockchain 306 from the servers 120. In some cases, the functions of the blockchain interface 302 may be performed by one of the servers 120, which may hold its own copy of the blockchain 306.

The blockchain interface 302 calculates a hash of the previous, most recent block of the blockchain 306. The blockchain interface 302 then uses the newly created hash, the new slice signature 304, and a corresponding timestamp to create a modified blockchain 308, and sends the modified blockchain 308 to the servers 120. A peer-to-peer consensus procedure is then implemented to distribute the modified blockchain to all of the servers 120. This procedure may utilize an appropriate consensus algorithm, such as, for example, Byzantine Fault Tolerance, Proof-Based Consensus, Voting-Based Consensus, Crash-Based Fault tolerance, etc. Assuming that the servers 120 reach consensus on the data modification, the modified blockchain 308 is replicated and committed by all of the severs 120.

Figure 4:
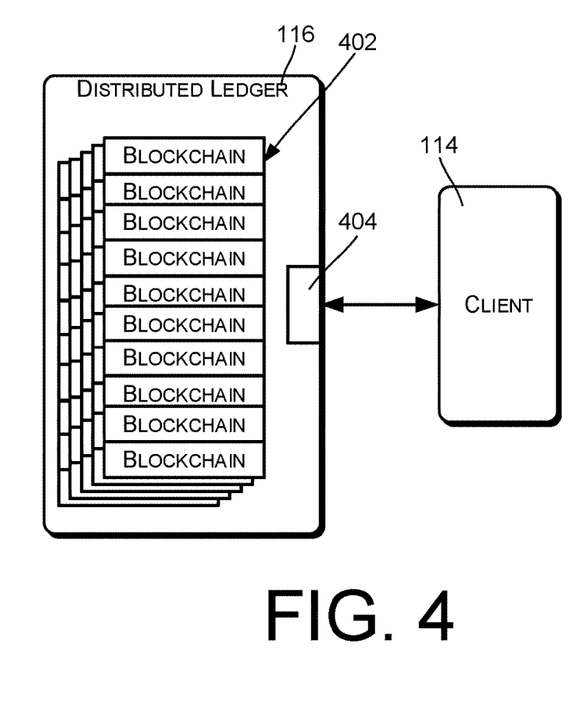
FIG. 4 is a block diagram illustrating the storage of multiple blockchains, respectively indicating historical network integrity of different network subsystems.

FIG. 4 shows how historical integrity data may be maintained for later use in verifying past network slice integrity. When the distributed ledger 116 is implemented using blockchain technology, the distributed ledger 116 stores multiple blockchains 402, corresponding respectively to different network slices 104 of an operator's network. In some embodiments, the distributed ledger 116 may have an application programming interface 404 that can be accessed by the client 114 to obtain blockchains for inspection and for proof of network integrity. For example, the client 114 may be a customer application configured to obtain one or more blockchains that have integrity records for one or more network slices that are operated for the benefit of the customer. The client 114 may also comprise a threat management system as mentioned above, which may access and analyze the blockchains to detect integrity violations.

In some embodiments, the distributed ledger 116 may be a public blockchain system that can be accessed by any interested party, with the integrity of the data being ensured by the consensus synchronization between the distributed servers and databases.

In some cases, the client 114 may have read-only access to the distributed ledger 116 so that it can obtain and analyze stored data directly from the distributed ledger system 116 rather than querying the threat monitor 108 for information.

Figure 5:
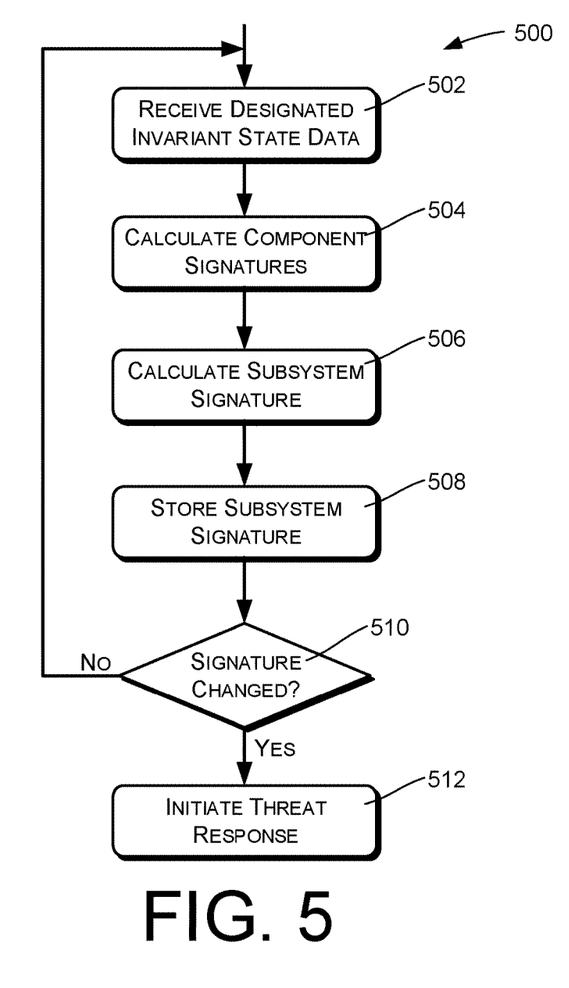
FIG. 5 is a flow diagram illustrating an example method of detecting malicious activities performed against a network subsystem such as a network slice.

FIG. 5 illustrates an example method 500 of detecting potential threats to the integrity of a network subsystem such as a network slice of a telecommunication network. The method 500 works by monitoring signatures that have been calculated from designated invariant state properties of the components of the network subsystem. The method 500 may be performed by a monitoring system or component, such as the threat monitor 108 described above, or by any other component.

An action 502 comprises receiving designated invariant state data from the components of the network subsystem, where the designated invariant state data is based at least on part on one or more designated invariant properties of each component. An action 504 comprises calculating a component signature of the designated invariant state data of each of the components.

The term "designated invariant" is used here to refer to data, properties, information, etc. of a component that do not change during normal operation of the component. Designated invariant state data includes state properties that should remain constant. It is assumed that any change in a designated invariant state property signifies some type of problem such as a threat to the integrity of the component.

In other words, a change in any designated invariant state property could be a result of unauthorized activity involving the component.

The following are examples of state properties, any of which might be designated as invariant in certain cases:
- content of a software image;
- content of a firmware image;
- content of a file;
- stored data;
- a setting or configuration parameter;
- whether an application or other software component is in memory and/or executing;
- a permission, such as for permitted administrators and users;
- whether a patch or update has been applied;
- content of a code image of a patch or update;
- whether a file is present;
- whether a file is absent;
- whether a resource is available or sufficient;
- etc.

State data and state properties may include hashes or other signatures of the state properties above or of any other designated invariant data. For example, an MD5 (message digest 5) hash of file or firmware image might be used as an invariant property, where the firmware image itself is intended to be invariant.

In some cases, the designated invariant state data may comprise a component signature corresponding to each component of the subsystem, where the component signature is generated based on a state of the component at a corresponding time.

The actions 502 and 504 may in some cases be performed by the components themselves. For example, each component may have a background daemon that collects designated invariant state properties and hashes them to produce a component signature.

In other cases, a software function such as the threat monitor 108 may collect the designated invariant state properties from the components and calculate the component signatures based on the collected invariant state properties.

In some examples, network components can report the designated invariant state signatures periodically, e.g., hourly. In some examples, network components can report state signatures on request from a management server, such as the threat monitor 108, or at predetermined times. For example, the components in a slice primarily used in a particular time zone can be configured to report their signatures at times that are during the business day in that time zone. This can permit the threat monitor 108 to obtain current signature information or change/no-change indications during normal business hours. In some examples, network components can be configured to stagger their reporting times to provide a steadier (less peaky) flow of transactions. For example, each network component can be configured to report at intervals of H hours (H≥1), at approximately M minutes past the hour (M≥0). Different network components can be given different M values to spread the network load and increase the transaction capacity of the distributed ledger.

In some examples, network components can report signatures in response to detection of a signature change, even if a periodic-reporting schedule would not normally call for a signature to be reported at that time. This can provide more rapid detection of malicious activity, which can in turn permit more effective mitigation.

The action 504 of calculating the component signatures may be performed in different ways. For example, the action 504 may comprise calculating a cryptographic hash of the designated invariant state data, such as by applying any of multiple available cryptographic hash functions. MD5 (message digest 5), SHA-1 (secure hash algorithm 1, and SHA-2 (secure hash algorithm 2) are examples of suitable hash functions. The component signatures may alternatively comprise checksums of the designated invariant state data.

After calculating a component signature corresponding to each of the subsystem components, an action 506 is performed of calculating a subsystem signature. The subsystem signature is a signature representing the state of the monitored subsystem. The subsystem signature can be created by concatenating the individual component signatures and applying a hash function to the resulting concatenated bit string or other data object. Again, any of multiple available cryptographic hash functions may be used in the action 506, including MD5, SHA-1, and SHA-2 hash functions. In some cases, the subsystem signature may comprise a Merkle tree root hash of the individual component signatures.

An action 508 comprises storing the subsystem signature. As described above, the subsystem signature may be stored in a distributed ledger system, such as the distributed ledger system 116. In some cases, the distributed ledger system may comprise a private or public blockchain ledger system, in which new subsystem signatures are appended to existing blockchains as described above with reference to FIGS. 2 and 3.

An action 510 comprises determining whether the most recently generated subsystem signature is different than the most recent previous signature. If there has been a change in the value of the subsystem signature, an action 512 is performed of initiating an integrity threat response, such as generating a notification or alerting a threat detection system. If the signature has not changed, the preceding actions are repeated. Any change between consecutive first and second subsystem signatures generated by the action 506 is treated as a potential threat.

The actions 502, 504, 506, 508, and 510 may be performed repeatedly or periodically to calculate and store a chronological sequence of multiple signatures for each subsystem, based on state data received over time from the components of the subsystem. Each signature is based on a set of the designated invariant state data corresponding to a particular time. In the case of a dynamically created network slice, the stored signatures may correspond to the entire lifecycle of the network slice. The stored chronological sequence of signatures is preserved as historical evidence of the integrity of the monitored subsystem.

Figure 6:
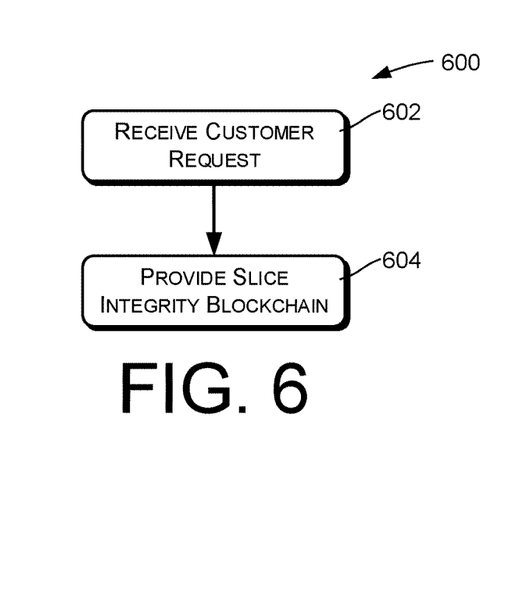
FIGS. 6, 7, and 8 are flow diagrams illustrating example methods of providing proof of historical subsystem integrity.

FIG. 6 illustrates an example method 600 of providing integrity assurance to customers that are associated with network subsystems such as network slices. An action 602 comprises receiving a customer request for verification of network subsystem integrity. For example, a customer component might communicate with an application programming interface (API) of a network provider to request historical records regarding the integrity of a specified network subsystem. In response, an action 604 may be performed of providing a data object, such as one of the blockchains 402, corresponding to the network subsystem. The blockchain is provided as historically immutable verification of the subsystem integrity. The customer can audit the blockchain by verifying the hash of each block, from the beginning block to the most recent block, and confirming that all the stored signatures are the same.

Figure 7:
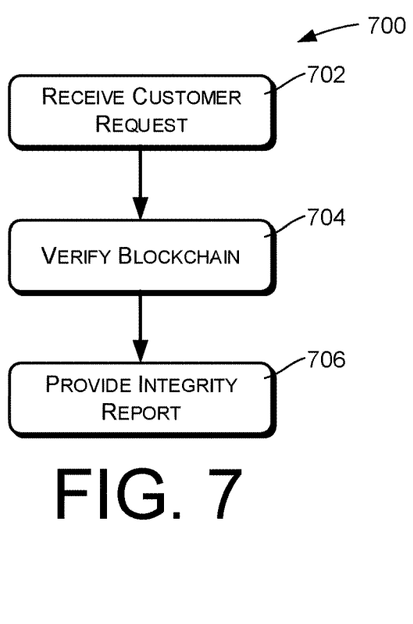

FIG. 7 illustrates another example method 700 of providing integrity assurance to a customer that is associated with a network subsystem such as a network slice. An action 702 comprises receiving a customer request for verification of network subsystem integrity. For example, a customer might communicate with an API of a network provider to request an audit of historical records regarding the integrity of a network slice. In response, an action 704 is performed of accessing and analyzing the blockchain corresponding to the network subsystem. For example, the action 704 may comprise verifying the hash of each block of the blockchain, from the beginning block to the most recent block, and checking that all of the stored signatures are the same.

An action 706 may comprise reporting the results of the analysis to the requesting customer, such as by providing an integrity report indicating whether or not the integrity of the network subsystem has been violated during its lifetime. In cases where there has been an integrity violation, the action 706 may comprising indicating the time at which the violation occurred, based on timestamps associated with the stored signatures.

Figure 8:
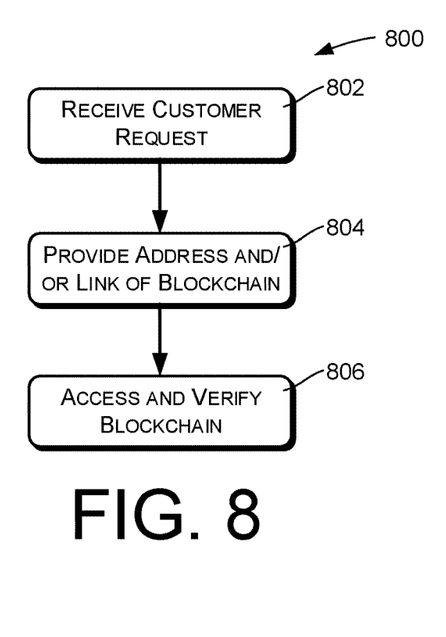

FIG. 8 illustrates yet another example method 800 of providing integrity assurance to a customer that is associated with a network subsystem such as a network slice. An action 802 comprises receiving a customer request for verification of network subsystem integrity. For example, a customer might communicate with an API of a network provider to request an audit of historical records regarding the integrity of a network slice. In response, an action 804 is performed of providing a network address of or link to of the blockchain corresponding to the network subsystem to the requesting entity. An action 806, which may be performed by the network-based computer system of the customer, may comprise accessing and analyzing the blockchain to verify the historical integrity of the network subsystem.

Figure 9:
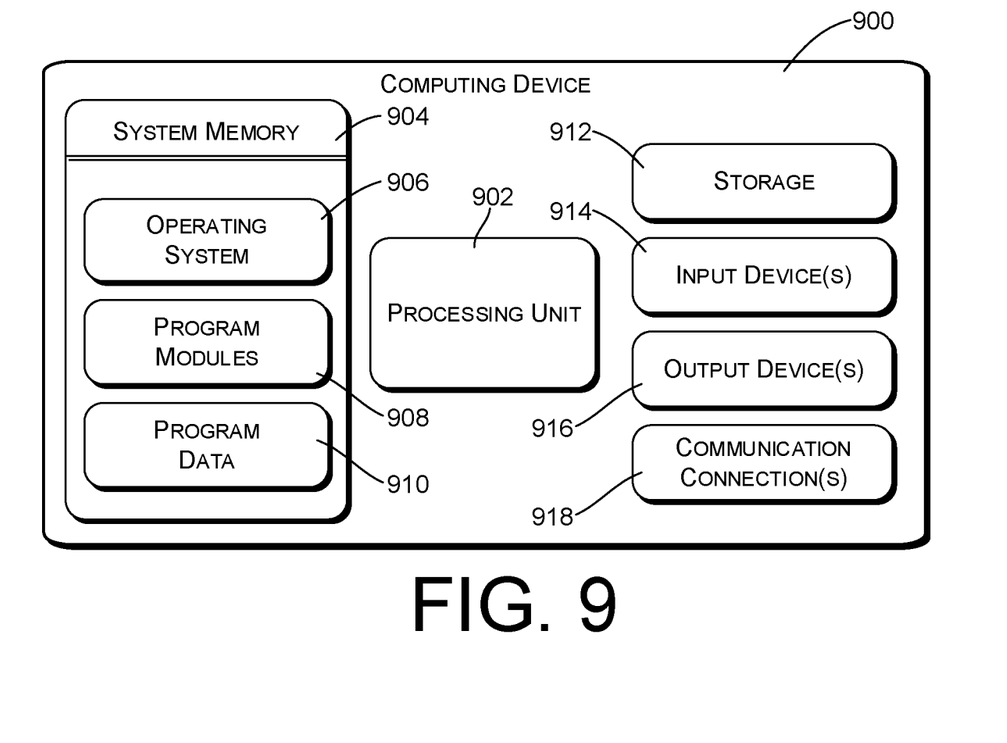
FIG. 9 is a block diagram of an example computing device that may be configured in accordance with the described techniques.

FIG. 9 is a block diagram of an illustrative computing device 900 such as may be used to implement various components described above. Generally, one or more computing devices 900 may be used to implement any of the components and/or functionality of the preceding FIGS. 1-8.

In various embodiments, the computing device 900 may include at least one processing unit 902 and system memory 904. Depending on the exact configuration and type of computing device, the system memory 904 may be volatile (such as RAM), nonvolatile (such as ROM, flash memory, etc.) or some combination of the two. The system memory 904 may include an operating system 906, one or more program modules 908, and may include program data 910.

The computing device 900 may also include additional data storage devices (removable and/or non-removable) such as, for example, magnetic disks, optical disks, or tape. Such additional storage devices are illustrated in FIG. 9 as storage 912.

Non-transitory computer storage media of the computing device 900 may include volatile and nonvolatile, removable and non-removable media, implemented in any method or technology for storage of information, such as computer readable instructions, data structures, program modules, or other data. The system memory 904 and storage 912 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer-readable storage media may be part of the computing device 900.

In various embodiments, any or all of the system memory 904 and storage 912 may store programming instructions which, when executed, implement some or all of the function functionality described above. Any or all of the system memory 904 and storage 912 may also be used for storage of distributed ledger data, including blockchains.

The computing device 900 may also have input device(s) 914 such as a keyboard, a mouse, a touch-sensitive display, voice input device, etc. Output device(s) 916 such as a display, speakers, a printer, etc. may also be included. The computing device 900 may also contain communication connections 918 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A system for monitoring integrity of a network slice, comprising:
one or more processors; and
memory storing computer-executable instructions that, when executed by the one or more processors, cause the one or more processors to perform operations comprising:
receiving state data from components of the network slice, wherein the state data corresponds to a time, the state data corresponds to a subset of state properties of the components captured at the time, and the subset of state properties are those state properties of the components that are expected to remain unchanged throughout a lifecycle of the network slice;
calculating a chronological sequence of signatures based on the state data received over time from the components of the network slice;
storing the chronological sequence of signatures as a blockchain, in a distributed ledger, as a historical record of network slice integrity;
receiving a customer request for verification of the network slice integrity;
in response to the customer request, providing the chronological sequence of signatures as verification of the network slice integrity; and
initiating an integrity threat response in response to the signatures not being equal to each other.

2. The system of claim 1, wherein the state data comprises component signatures received from the components of the network slice.

3. The system of claim 1, wherein the distributed ledger uses consensus-based data synchronization between multiple distributed data stores.

4. The system of claim 1, wherein:
the distributed ledger uses consensus-based data synchronization between multiple distributed data stores; and
the signatures are stored as blocks of a blockchain in the distributed data stores.

5. The system of claim 1, wherein:
calculating the chronological sequence of signatures comprises calculating cryptographic hashes of the state data.

6. The system of claim 1, wherein initiating the integrity threat response comprises generating a notification.

7. A method, comprising:
receiving component signatures from components of a network slice, wherein each of the component signatures corresponds to a respective component of the network slice and is generated based on state data of the respective component captured at a corresponding time, the state data corresponds to a subset of state properties of the respective component, and the subset of state properties are those state properties of the respective component that are expected to remain unchanged throughout a lifecycle of the network slice;
calculating a chronological sequence of slice signatures based on the component signatures;
storing the chronological sequence of slice signatures as a blockchain, in a distributed blockchain ledger, as a historical record of network slice integrity;
receiving a customer request for verification of the network slice integrity;
in response to the customer request, providing the chronological sequence of slice signatures from the blockchain as verification of the network slice integrity; and
initiating an integrity threat response in response to the slice signatures not being equal to each other.

8. The method of claim 7, wherein the blockchain comprises multiple linked data blocks respectively containing the slice signatures of the chronological sequence.

9. The method of claim 7, wherein the distributed blockchain ledger uses consensus-based data synchronization between multiple distributed data stores.

10. The method of claim 7, wherein the distributed blockchain ledger comprises a public blockchain ledger that can be accessed by a customer to verify the network slice integrity.

11. The method of claim 7, wherein the components comprise one or more of:
a router;
a switch;
a gateway;
an Internet-of-things device;
a virtual network function;
a container;
a software application;
a software module;
a virtual machine;
a radio;
a radio access network;
an Internet Multimedia Subsystem (IMSs).

12. One or more non-transitory computer-readable media storing computer-executable instructions that, when executed by one or more processors, cause the one or more processors to perform actions comprising:
repeatedly receiving state data from components of a network slice, wherein the state data is based at least in part on a subset of properties of the components and the subset of the properties are those properties of the components that are expected to remain unchanged throughout a lifecycle of the network slice;
calculating a chronological sequence of signatures based on the state data, wherein each of the signatures is based on a set of the state data;
storing the chronological sequence of signatures as a blockchain, in a distributed ledger, as a historical record of network slice integrity;
receiving a customer request for verification of the network slice integrity;
in response to the customer request, providing the chronological sequence of signatures as verification of the network slice integrity; and
initiating an integrity threat response in response to the signatures not being equal to each other.

13. The one or more non-transitory computer-readable media of claim 12, wherein the distributed ledger uses consensus-based data synchronization between multiple distributed data stores.

14. The one or more non-transitory computer-readable media of claim 12, wherein the distributed ledger is a distributed blockchain ledger.

15. The one or more non-transitory computer-readable media of claim 12, wherein the subset of properties include one or more of:
content of a software image;
content of a firmware image;
content of a file;
stored data;
a setting or configuration parameter;
whether an application or other software component is in memory and/or executing;
a permission;
whether a patch or update has been applied;
content of a code image of a patch or update;
whether a file is present;
whether a file is absent; or
whether a resource is available or sufficient.

* * * * *